United States Patent [19]

Beatty

[11] Patent Number: 4,976,042

[45] Date of Patent: Dec. 11, 1990

[54] SINE PLATE ADJUSTABLE TENSION CLAMP

[76] Inventor: Robert Beatty, 133 Beatty St., Apollo, Pa. 15613

[21] Appl. No.: 537,782

[22] Filed: Jun. 14, 1990

[51] Int. Cl.$^5$ .............................................. G01B 3/30
[52] U.S. Cl. ..................................................... 33/536
[58] Field of Search .......................... 33/536, 537, 538

[56] References Cited

U.S. PATENT DOCUMENTS

| 2,609,612 | 9/1952 | Mull | 33/538 |
| 2,816,489 | 12/1957 | Robbins et al. | 33/537 X |
| 3,432,934 | 3/1969 | Schmidt | 33/538 |

*Primary Examiner*—Harry N. Haroian
*Attorney, Agent, or Firm*—Richard C. Litman

[57] ABSTRACT

An adjustable clamp is provided for sine plates that make use of gage blocks to set the appropriate height and angle. A chain is disposed through a clamp block having two capstans. An adjustable screw bolt wedges the chain against the capstans and can increase or decrease the tension on the chain depending on whether the chain is pulled between the capstans or released. The chain ends are bolted to the bottom plate of the sine plate and hooked over a catch on the upper plate. Increasing the tension in the chain applies pressure between the gage block and the plates of the sine plate to prevent the gage block from being inadvertently displaced. The clamp stabilizes the sine plate so that the workpiece has a stable mounting.

8 Claims, 2 Drawing Sheets

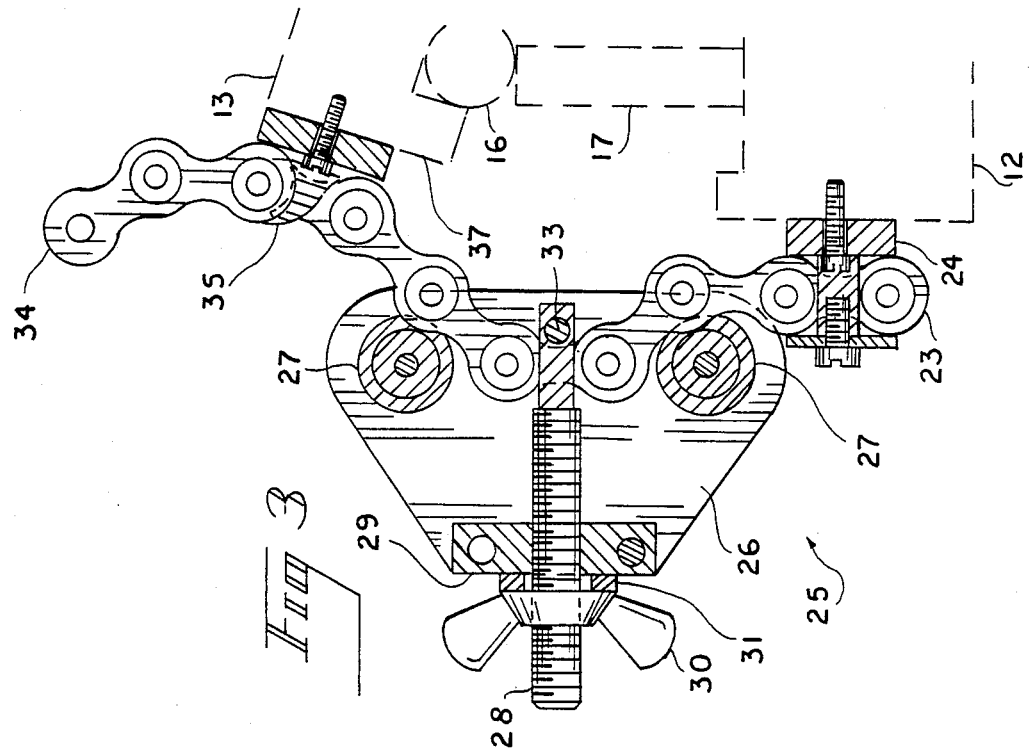
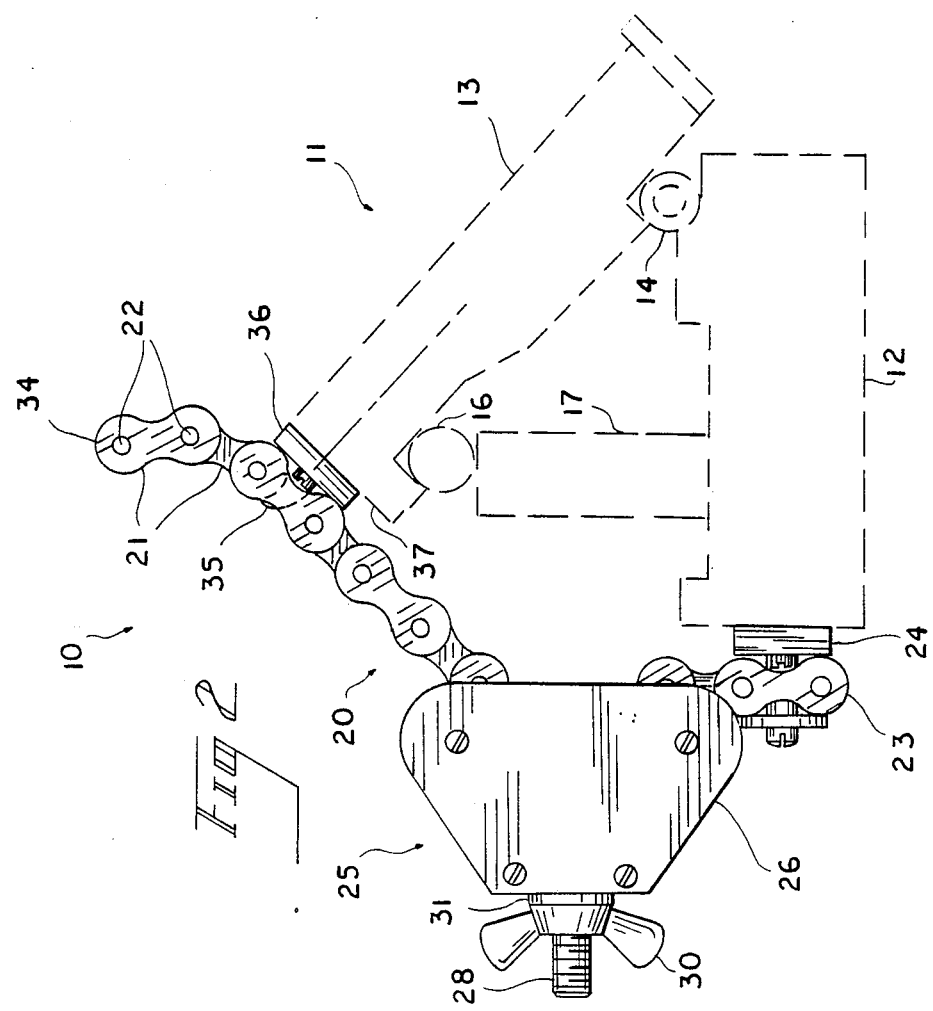

SINE PLATE ADJUSTABLE TENSION CLAMP

BACKGROUND OF THE INVENTION

1. Field of the Invention

The present invention concerns clamps and workpiece holders. More particularly, it concerns a means of securely clamping a sine plate. Sine plates are used to accurately locate a workpiece at an ultra precision chosen angle. They usually comprise two pivoting plates hinged on a mutual edge. A gage block or combination of gage blocks is set between the spread apart plates to hold them to a particular angular relationship.

Usually these gage blocks are held in place by a locking strap attached to the side of the sine plate. Sine plates are often set at a steep angle (i.e., large angle between the top and bottom plates). Many times the weight is on the outside center pivot of the sine plate hinge, putting it off balance and causing to fall open, thus throwing the part being machined into the grinding wheel or machining cutter. Sine plates are usually stable when the angle between the top and bottom plates is shallow.

It is a common practice to put screws into holes on the open end of the sine plate and to use rubber bands looped around the screws and the workpiece to prevent any movement. This is a very insecure means of holding the workpiece in position. The stacks of blocks are prone to vibrate loose in the machining process. Forces present during machining of a workpiece mounted onto the sine plate can vibrate the gage blocks loose and collapse the sine plate and the workpiece. Such a collapse can present danger and possible injury to the worker involved with the workpiece.

Presented in this application is a new and effective means of securely clamping a sine plate in position.

2. Description of the Prior Art

Numerous previously disclosed devices have made use of the screw tightened tension of a flexible member in order to tighten a clamp hold. Some of these devices known to the applicant are listed and discussed below.

U.S. Pat. Nos. 1,227,449 and 2,903,930 issued to Jones and Peterson et al. respectively disclose pipe vises with chain-tightening screw wherein the chain encircles the pipe disposed on the vise cradle.

U.S. Pat. No. 826,131 issued to weaver describes an adjustable screw bolt that acts as a tension clamp. The force that is applied is purely linear, as the direction of tension is in line with the axis of the bolt.

U.S. Pat. No. 2,583,917 issued to Wiegant describes a chain clamp use to hold a workpiece while a lathe cuts a slot or keyway into the workpiece.

U.S. Pat. Nos. 1,326,999, 1,410,553 and 2,968,978 issued to Wallace et al., Cox and Wheeler disclose similar pipe clamps that make use of wrap around chains which are tensioned by means of a screw bolt attached to one end of the chain. None of the above recited clamp devices are used with a sine plate. The above devices are concerned with the holding steady of an object and not its exact positioning.

U.S. Pat. No. 4,398,349 issued to Bailey shows an arctuate locking strap having one end pivotally mounted to the base of a sine plate. The arctuate section of the strap has a slot in which rides a clamping bolt threaded into the top plate, for fixing the strap to the top plate in a certain position and thereby fixing the angle of the top plate. The arc of the strap is of varying radius such that the strap never rides above the edge of the top plate.

SUMMARY OF THE INVENTION

Accordingly, it is an object of the present invention to provide an adjustable tension clamp that is adjustable in regards to the tension that is applied.

It is one object of the present invention to provide an adjustable tension clamp for a sine plate that applies tension between the two opposing plates of the plate.

It is another object of the present invention to provide an adjustable tension clamp for a sine plate that has means to adjust tension on a clamping chain that connects the ends of the opposing plates of the sine plate.

It is an additional object of the present invention to provide an adjustable tension clamp for a sine plate that serves to prevent dislodgement of the gage blocks used with the sine plate. By clamping the opposing plates together, the gage blocks are securely held between them.

These and other objects of the present invention will become readily apparent upon further review of the following specification and drawings.

BRIEF DESCRIPTION OF THE DRAWINGS

FIG. 2 is a side view of the adjustable clamp holding and applying tension to the opposing plates of the sine plate.

FIG. 3 is a side view in cross section of the adjustable clamp detailing the means of adjusting the tension.

Similar reference characters denote corresponding features consistently throughout the attached drawings.

A DETAILED DESCRIPTION OF THE PREFERRED EMBODIMENT

Figure 1:
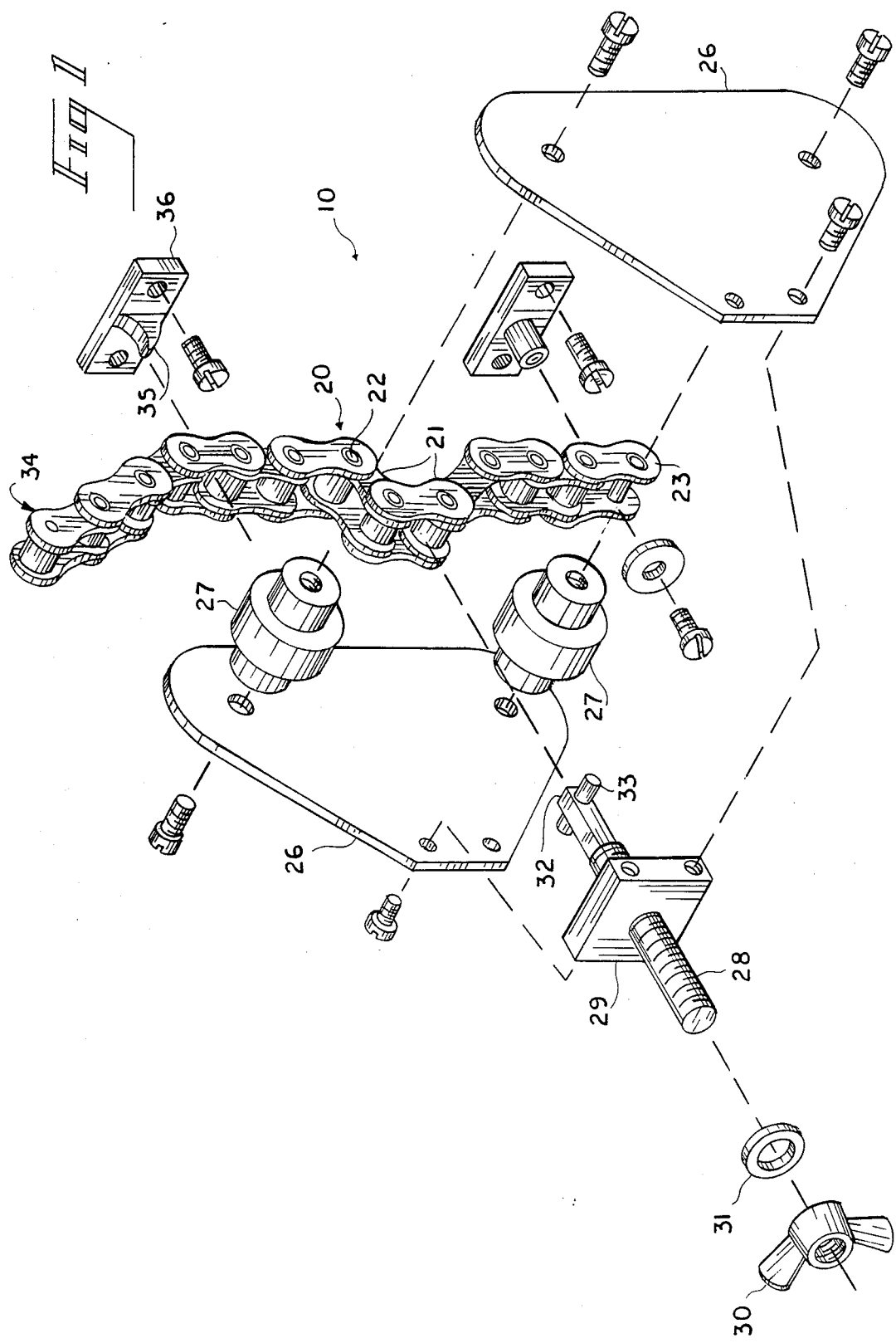
FIG. 1 is a perspective exploded view of the various components that make up the present invention.

A view of the adjustable clamp 10, in the form of a hollow locking block 25 and roller chain 20, and its attachment to a sine plate 11 is shown in FIG. 2. The sine plate 11 comprises a bottom base plate 12 pivotally mounted to a top plate 13. The pivotal mounting is accomplished by means of a precision hinge 14 that is shared by the two plates 12, 13. Normally, one or more gage blocks 17 are set between the two plates 12, 13 to set the height and angle at which the sine plate 11 and the workpiece mounted thereto will be positioned. The free end of the upper plate 13 has a pin 16 under which the gage block 17 is mounted. Notice though in this situation, with the gage block merely sitting under the upper plate 13, it is quite easy to dislodge the gage block 17 from under the sine plate. The present invention prevents the instability inherent in a conventional sine plate arrangement.

The clamp 10 is composed of a length of chain 20 made up of interlocking segments 21 that are sequentially attached by pivoting pins 22. One end 23 of this chain 20 is bolted to a clamp base plate 24. The clamp base plate 24 is bolted to the free end of the bottom plate 12 of the sine plate 11. The chain 20 is then disposed through the clamp adjustment locking block 25 as shown in FIG. 3. Between the two parallel plates 26 that form the clamp adjustment block 25 are two capstans 27. An adjustment shaft or bolt 28 is disposed between the two plates 26 and in between the two capstans 27. Capstans 27 act as spacers between the two plates 26. The capstans have central portions of enlarged diameter which act as chain guides to prevent lateral motion of the chain. The adjustment bolt 28 is mounted through an adjustment plate 29 that is disposed between the clamp plates 26 at one end. The end of the adjustment bolt 28 that is external to the adjustment block 25 is threaded and has a wing nut 30 and washer 31 placed over it. The interior end 32 of the adjustment bolt 28 has a crossmember or crossbar 33 normal to the length of the bolt 28. The bolt 28 is disposed through a segment 21 of the chain 20. The crossbar 33 is positioned to lock the chain 20 and bolt 28 together. The chain 20 is therefore wedged between the capstans 27 and the crossbar 33. By turning the wingnut 30 on the bolt 28 the tension on the chain can be adjusted.

The opposite end of the chain 34 is disposed over a hook 35 that extends outwardly from a hook plate 36 that bolts to the free end 37 of the upper plate 13 of the sine plate 11. The free end 34 of the chain can then be attached to the hook 35 by placing the hook 35 through a segment 21 of the chain. Rotating the wingnut 30 then adjusts the tension on the chain 20 and therefore applies pressure to the sine plate 11 and gage block 17. This presents a more stable workpiece mount than simply allowing the gage block 17 to stand free.

It is to be understood that the present invention is not limited to the sole embodiment described above, but encompasses any and all embodiments within the scope of the following claims. In particular, the clamp described herein may be applied to various jigs, fixtures, and other devices, as well as to sine plates.

I claim:
1. An adjustable clamp including:
   a hollow locking block having at least a portion open to the exterior;
   an elongated flexible member having two ends and a middle portion, part of said middle portion disposed within said hollow locking block through said portion open to the exterior, one of said ends affixed to a first section of a device and the other said end removably attached to a second section of a said device;
   a tension adjustment means comprising an elongated shaft mounted to and disposed through said hollow locking block and connected to said part of said middle portion of said elongated flexible member, said elongated shaft axially movable in relation to said hollow locking block to therefore adjust the tension on said elongated flexible member.
2. The adjustable clamp according to claim 1, wherein:
   said device is a sine plate having a base plate pivotally mounted to a top plate;
   said first section of said device is said base plate of said sine plate; and
   said second section of said device is said top plate of said sine plate.
3. The adjustable clamp according to claim 1, wherein:
   said elongated flexible member is a chain composed of individual linked segments, said elongated shaft being disposed through a single one of said segments.
4. The adjustable clamp according to claim 3, wherein:
   said device is a sine plate having a base plate pivotally mounted to a top plate;
   said first section of said device is said base plate of said sine plate; and
   said second section of said device is said top plate of said sine plate.
5. The adjustable clamp according to claim 1, wherein:
   said elongated shaft is a threaded member having a reciprocally threaded nut disposed over said threaded member and external to said hollow locking block, whereby rotation of said nut axially displaces said threaded member and said flexible member.
6. The adjustable clamp according to claim 5, wherein:
   said device is a sine plate having a base plate pivotally mounted to a top plate;
   said first section of said device is said base plate of said sine plate; and
   said second section of said device is said top plate of said sine plate.
7. The adjustable clamp according to claim 4, wherein:
   said other end of said chain removably attaches to said upper plate of said sine plate by a hook mounted to said upper plate engaging an individual segment of said chain.
8. The adjustable clamp according to claim 5, wherein:
   an end of said threaded member attached to said flexible member has disposed thereon at least one cross member normal to the length of said threaded member which engages said flexible member.

* * * * *